US005595687A

United States Patent [19]

Raynolds et al.

[11] Patent Number: 5,595,687
[45] Date of Patent: Jan. 21, 1997

[54] EMULSION STABILITY

[75] Inventors: Stuart Raynolds, Wilmington; Robert H. Dettre, Hockessin, both of Del.

[73] Assignee: Thomas Jefferson University, Philadelphia, Pa.

[21] Appl. No.: 419,515

[22] Filed: Apr. 7, 1995

Related U.S. Application Data

[63] Continuation of Ser. No. 968,650, Oct. 30, 1992, abandoned.

[51] Int. Cl.$^6$ ............................................. B01J 13/00
[52] U.S. Cl. .................. 252/312; 206/524.3; 252/314; 428/402.2; 514/832; 514/938
[58] Field of Search ..................... 252/312, 314; 514/832, 833, 938; 206/438, 524.3

[56] References Cited

U.S. PATENT DOCUMENTS

| | | | |
|---|---|---|---|
| 2,504,482 | 4/1950 | Goldman | 604/403 |
| 3,823,091 | 7/1974 | Samejima et al. | 252/312 |
| 3,911,138 | 10/1975 | Clark, Jr. | 514/746 |
| 3,958,014 | 5/1976 | Watanabe et al. | 514/772 |
| 3,962,439 | 6/1976 | Yokoyama et al. | 514/759 X |
| 3,989,843 | 11/1976 | Chabert et al. | 514/672 |
| 3,993,581 | 11/1976 | Yokoyama et al. | 252/312 |
| 4,252,827 | 2/1981 | Yokoyama et al. | 514/776 |
| 4,369,127 | 1/1983 | Cormier et al. | 252/312 X |
| 4,423,077 | 12/1983 | Sloviter | 514/759 |
| 4,443,480 | 4/1984 | Clark, Jr. | 514/832 X |
| 4,497,892 | 2/1985 | Anderson | 430/347 |
| 4,591,593 | 5/1986 | Yokoyama et al. | 514/307 |
| 4,713,459 | 12/1987 | Yokoyama et al. | 546/150 |
| 4,722,904 | 2/1988 | Feil | 252/312 X |
| 4,865,836 | 9/1989 | Long, Jr. | 424/5 |
| 4,866,096 | 9/1989 | Schweighardt | 514/832 X |
| 4,927,623 | 5/1990 | Long, Jr. | 514/832 X |
| 4,981,691 | 1/1991 | Osterholm et al. | 424/422 |
| 4,987,154 | 1/1991 | Long, Jr. | 514/772 |
| 5,335,769 | 8/1994 | Klokkers-Bethke et al. | 206/438 |

FOREIGN PATENT DOCUMENTS 60166626  2/1984  Japan .

OTHER PUBLICATIONS

"Unemulsified Fluorocarbon", Application of Computer-Based Experimental Design to Optimization of Processing Conditions..., G. K. Hanna et al., Alliance Phar. Corp., San Diego, CA. Biomat., Art. Cells & Immob. Biotech., 20(2-4), 849-852, 1992.

"Properites of Polyorganosiloxane Surfaces on Glass", M. J. Hunter et al., Dow Corning Corp., Midland, MI Industrial & Engineering Chemistry, vol. 39, No. 11, Nov. 1947, pp. 1389-1395.

Primary Examiner—Richard D. Lovering
Attorney, Agent, or Firm—Woodcock Washburn Kurtz Mackiewicz & Norris

[57] ABSTRACT

An injectable physiologically acceptable aqueous phase fluorocarbon emulsion, which has substantially no free fluorocarbon, has an excellent stability is prepared by a process of the invention. Typically, more than about 99.8 wt. % of the fluorocarbon remains in the size range of about 0.2 to 0.4 microns even after being stored at room temperature for one year or more in sealed containers under a non-oxidizing atmosphere. The emulsion is useful in medical applications, for example, coronary angioplasty, cancer therapy, among others.

13 Claims, No Drawings

EMULSION STABILITY

CROSS-REFERENCE TO RELATED APPLICATION

This is a continuation of application Ser. No. 07/968,650, filed Oct. 30, 1992, now abandoned.

FIELD OF THE INVENTION

The present invention relates to an injectable physiologically acceptable aqueous fluorocarbon emulsion.

BACKGROUND OF THE INVENTION

Certain fluorocarbon emulsions are known to the art, and their use in a number of medical applications has been described.

U.S. Pat. No. 3,911,138 is directed to an artificial blood comprising aqueous emulsions of perfluorocyclocarbons. The upper limit of the emulsion droplet size is given as 100 microns. The disclosure of this patent lacks any mention of sterilization procedures or the storage stability of these emulsions.

U.S. Pat. No. 3,958,014 relates to a process for making injectable emulsions of perfluorocyclocarbons. The preferred emulsion concentrations of perfluorocyclocarbon and lecithin are 25–30% (w/v) and 3/5% (w/v), respectively. Sterilization of the emulsion is performed in a rotating autoclave at 110°–120° C. While the emulsion droplet size is in the range of 0.05–0.25 microns, the emulsions are stable for only two days.

U.S. Pat. No. 3,962,439 is related to emulsions of a group of fluorocarbons. The emulsifying agents are mixtures of phospholipids and fatty acids.

U.S. Pat. No. 3,989,843 discloses preparing fluorocarbon emulsions. Lecithin is not disclosed as being acceptable for use as an emulsifying agent. The emulsions of this patent, which are sterilized while being stirred, separate after being stored for several months.

U.S. Pat. No. 4,423,077 describes compositions comprising stable emulsions of fluorocarbons 30–75% (w/v) and an emulsifying phospholipid, such as lecithin, 7–9% (w/v).

U.S. Pat. No. 4,252,827 describes emulsions consisting of F-Decalin and F-Tripropylamine mixtures which are sterilized in a rotary autoclave. When stored for six months at a temperature of 4° C., the mean particle size of these emulsions was substantially unchanged.

U.S. Pat. No. 4,497,892 relates to emulsion compositions containing two perfluoro-compounds, 10–50% (w/v) total, a mixed emulsifying agent which comprises nonionic surfactants, phospholipids and fatty acids. The emulsions of this patent are sterilized in a rotary autoclave. The components are frozen and stored separately. The emulsions must be used within twenty-four hours of thawing and mixing the components.

U.S. Pat. Nos. 4,591,593 and 4,713,459 disclose processes for preparing F-N-methyldecahydroquinoline. An emulsion can be prepared by using lecithin as an emulsifying agent. Thermal sterilization is performed by using a rotary autoclave.

U.S. Pat. Nos. 4,865,836, 4,981,691, and 4,987,154, are directed to methods for making and using fluorocarbon emulsions.

JP 60-166,626 is directed to a process for making stable vascular contrast agent emulsions which contain fluorocarbons that have at least one bromine substitutent, and alpha-tocopherol (Vitamin E).

"Properties of Polyorganosiloxane Surfaces on Glass", by M. J. Hunter et al., Industrial and Engineering Chemistry, Vol. 39, No. 11 (November 1947), discusses applying an organosilcone film upon a glass surface.

The disclosure of each of the above-identified references is hereby incorporated by reference.

SUMMARY OF THE INVENTION

The present invention relates broadly to a method for preparing an emulsion wherein the quantity of free or unemulsified fluorocarbon is minimized. Without wishing to be bound by any theory or explanation, it is believed that the quantity of free fluorocarbon within an emulsion can be substantially completely eliminated by reducing, if not preventing, any interaction between the emulsion and the interior surface of a storage container. For example, it is believed that pretreating the storage container causes formation of an interior monolayer coating which can prevent such interaction. Should a fluorocarbon emulsion be introduced or injected into a body, the presence of free fluorocarbon is undesirable because free fluorocarbon may cause formation of emboli in the bloodstream.

One aspect of the present invention relates to a sterilized emulsion which can be stored under ambient conditions in sealed infusion bottles for a year or more without significant deterioration, e.g., when stored at about 24° C. the average emulsion droplet size increases to less than about 0.60 micron. Such an emulsion would be particularly valuable for emergency use at facilities which are limited or over extended, for example, in disaster relief.

In another aspect, the present invention relates to a process for preparing perfluorocarbon (PFC) emulsions in physiologically compatible saline solutions which can be stored for lengthy periods, e.g., storage for more than about 2 years at a temperature of about 4° C. or at least about 3 months at a temperature of about 24° C. The quality of the emulsion can be improved by pretreating the storage containers, bottles, vials, among others. Typically, greater than about 99.8 wt. % of the PFC emulsified droplets remain in the size range of about 0.2–0.4 micron, when stored for a period longer than about one year at room temperature in a non-oxidizing atmosphere within, for example, sealed bottles.

The emulsions comprise about 10 through about 50% volume/volume (v/v) of at least one liquid perfluorocarbon (PFC), which has a molecular weight in the range of about 460–520, about 1–8% weight/volume (w/v) of at least one emulsifying agent, and the balance comprising a physiologically acceptable saline solution.

A sterilized emulsion, which is prepared by the method described herein, can be stored at ambient temperatures in sealed infusion bottles for at least about one year. The substantially complete elimination of any free fluorocarbon from the present emulsions allows such emulsions to be used safely on demand for medical applications. As a result, the present invention is particularly valuable for medical emergencies, and in situations wherein the availability of hospital equipment is limited.

DETAILED DESCRIPTION OF THE INVENTION

The present invention relates broadly to minimizing the presence of free fluorocarbon in an emulsion. By minimizing the presence of free fluorocarbon, the invention can be employed as a process for preparing aqueous perfluorocarbon (PFC) emulsions which can be used in medical applications. By "perfluorocarbon" it is meant a substantially fluorinated fluorocarbon, e.g., this term encompasses completely fluorinated fluorocarbons and hydrogen-containing fluorocarbons. Further, such emulsions are stable over a period of at least one year when stored at room temperature (24° C.), or for at least about 2 years when stored at about 4° C. By "stable" it is meant that the droplet size of the emulsion does not increase significantly, e.g., when stored at about 4° C. the average droplet size of the emulsion remains less than about 0.60 micron. Such emulsions are typically physiologically acceptable to the human body so that these emulsions can be employed for medical purposes.

Physiologically acceptable PFC emulsions have the ability to dissolve large volumes of gases within the human body such as oxygen and carbon dioxide. This ability enables acceptable PFC emulsions to be used for blood substitutes, and in medical treatments which are more effective when supplementary oxygen can be delivered to critical body organs such as the heart, brain, liver, kidneys, among other organs. In view of the world-wide shortage of human blood for use in transfusions, and increasing concern about its freedom from undesirable species, there is a long felt need for an artificial blood which is stable under ambient conditions, and free from infectious agents.

In addition to being effective blood substitutes, the emulsions prepared by the invention are medically useful in coronary angioplasty, cancer radiotherapy and chemotherapy, heart reperfusion, emergency treatment for stroke, among other uses. These emulsions also may be incorporated into a synthetic cerebrospinal fluid composition. For example, the PFC emulsion can be employed in acute stroke therapy by incorporating the emulsion within an oxygenated fluorocarbon-based nutrient emulsion which is administered by ventriculocisternal perfusion. In some cases, a fluorocarbon emulsion can be employed as an artificial cerebrospinal fluid (CSF), which is delivered by direct flow into the lateral ventricle of the brain. Upon effective delivery of the oxygenated fluorocarbon emulsion, the fluorocarbon emulsion may be capable of salvaging significant quantities of brain tissue.

The emulsions made by the process of this invention comprise about 10 through about 50% (v/v) of at least one liquid PFC which has a molecular weight in the range of about 460–520, and 1–8% (w/v) of at least one emulsifying agent, the balance being a physiologically acceptable aqueous solution of electrolytes. Normally, substantially completely all of the PFC becomes a component of the emulsion. The droplet size of the emulsion prior to sterilizing is about 0.10 micron. After sterilizing the emulsion, the particle size of the emulsion droplets ranges from about 0.2 to about 0.4 micron. The emulsion droplet size can be measured by using a Coulter N4MD sub-micron particle analyzer.

The PFCs are substantially chemically inert, and have no known adverse effect upon human physiology. Suitable PFC characteristics are such that following delivery to the body, the PFC is substantially completely expelled from the body through the respiratory system. Any suitable PFC, which is readily excreted from the body, can be used for preparing an emulsion that has substantially no free fluorocarbon. Suitable PFCs can be produced by any process which avoids contamination with physiologically unacceptable substances, or a process wherein such substances can be adequately removed by using conventional separation methods.

Specific examples of suitable PFCs are perfluorooctyl bromide (PFOB), bisperfluorobutyl ethylene (F-44E), and mixtures thereof, among others. A suitable PFC is encapsulated or emulsified by being contacted with at least one emulsifying agent such as a phospholipid, e.g., egg yolk lecithin.

The emulsion is present within an aqueous medium such as a dilute solution of salts. For example, the aqueous medium may comprise electrolytes which are present at concentrations that are sufficient to obtain an isotonic emulsion. Typically, the aqueous electrolyte solution contains at least about 0.90 gram of electrolyte per liter of water for injection. Examples of suitable electrolytes comprise at least one member selected from the group of sodium chloride, potassium chloride, dibasic sodium phosphate, sodium bicarbonate, hydrated sodium citrate, hydrated calcium chloride, hydrated magnesium chloride, among others. For example, an aqueous electrolyte solution is obtained by preparing a buffered saline solution, e.g., about 7.4 g NaCl and 2.3 g $NaHCO_3$ per liter. In some cases, the electrolyte solution comprises a modified Tyrode's solution which has the following-general composition per liter:

| | |
|---|---|
| NaCl | 6.7 g |
| KCl | 0.4 g |
| $CaCl_2.2H_2O$ | 0.4 g |
| $NaHCO_3$ | 2.3 g |
| $MgCl_2.6H_2O$ | 0.5 g |

The ingredients for a Tyrode's solution can be dissolved into sterile water for injection, and diluted further to a final volume of about one liter.

For best results, the containers and equipment, which are used for preparing and storing the emulsion and its components, are thoroughly cleaned and sterilized prior to being used. Glassware is typically first cleansed by washing with aqueous isopropanol, e.g., about 70/30 v/v isopropanol/water; followed by rinsing with deionized water which has a neutral pH. Stainless steel parts of equipment, e.g., a homogenizer, which will contact the emulsion, can be washed at room temperature with an Alconox solution (Alcanox is a biodegradable compounded alkyl aryl sodium sulfonate available from Alconox Inc. New York, N.Y.). The glass equipment can then be heated in an oven to a temperature of at about 250° C. to ensure that the glass equipment is substantially pyrogen free. Failure to effectively clean containers and other processing equipment may introduce contaminants into the emulsion which impair the utility of the final emulsion.

When a Tyrode's solution is used as an electrolyte for preparing an emulsion, there can be a tendency for calcium carbonate to precipitate, thereby destabilizing the emulsion. For best results, calcium carbonate precipitation is reduced, if not prevented, by purging a freshly prepared electrolyte solution with carbon dioxide for about 15 to 30 minutes, and filtering the purged solution through an approximately 0.2 micron filter in a manner which assures sterility.

An electrolyte solution, which possesses an enhanced product sterility and a lower endotoxin content, can be obtained by conducting all the processing steps within a laminar flow hood. A class 100 laminar flow work space is normally satisfactory for this purpose. The laminar flow work space ensures that most particulate material above about 0.3 micron in size is continuously removed by filters, thereby providing a working atmosphere which contains less than about 100 particles above 0.3 micron per cubic foot. When the laminar flow work space is used in conjunction with conventional sterile processing techniques, the preparation of sterile, low endotoxin emulsions is enhanced.

For best results, prior to preparing the emulsion, the emulsifying agent, e.g., egg yolk lecithin, should be stored under nitrogen with dry ice refrigeration. Such storage is useful to prevent the emulsifying agent from undergoing any significant oxidative degradation, and/or microbial contamination. Oxidation typically has a detrimental effect on the stabilizing ability of the emulsifying agent.

The emulsion preparation process is begun by dispersing or intermixing the electrolyte solution and the emulsifying agent. The emulsifying agent can be dispersed within an electrolyte solution at room temperature by using a homomixer, e.g., supplied by Eppenbach, Greerco, Baldor/Boehm. The homomixer functions to apply a shear force or pre-agitate the emulsion, thereby admixing the electrolyte and emulsifying agent to create an electrolyte/emulsfying agent dispersion which has a relatively small droplet size. Dispersing the emulsifying agent into the electrolyte solution typically produces a milky electrolyte/emulsifying agent dispersion. The dispersion can be heated to about 55°–60° C. while under a nitrogen atmosphere, and then homogenized by using a Microfluidizer (supplied by Microfluidics, Inc.), or a Manton-Gaulin homogenizer, thereby producing a substantially translucent dispersion. The translucent dispersion is typically cooled to about 15°–20° C. The average size of the dispersion particles or vesicles, which can be determined by using a Coulter N4MD sub-micron particle size analyzer, typically ranges between about 0.08–0.1 micron.

Prior to introducing the PFC into the translucent dispersion described previously, the PFC should be purged with carbon dioxide for about 30 minutes to ensure that substantially no calcium carbonate is precipitated in the emulsion, e.g., all of the calcium carbonate, if any, is converted to a soluble calcium bicarbonate. After purging the PFC with carbon dioxide, the PFC can be added slowly to the translucent dispersion while rapidly agitating the dispersion and maintaining the temperature at about 15°–20° C. (An Eppenbach Homomixer is effective for agitating the dispersion.) An emulsion is usually obtained in about 15 minutes. The emulsion can be homogenized by being passed five to ten times through a Microfluidizer, or a Manton-Gaulin homogenizer. The emulsion can also be filtered by using a 10–12 micron filter to remove coarse particles.

The filtered emulsion is ready for storage, e.g., within glass infusion bottles. The presence of free fluorocarbon within the emulsion is substantially completely avoided, if not prevented, by pretreating the storage bottles or containers. For example, when storing the emulsion within a glass infusion bottle, the presence of free fluorocarbon within the emulsion can be prevented by pretreating the interior surface of the bottle. The interior of the bottles can be pretreated by being coated or sprayed at room temperature with, for example, a saline lecithin dispersion. The pretreated bottles can be inverted to drain the pretreating dispersion or solution, and then filled with the PFC emulsion. After being filled with the PFC emulsion, the bottles are typically back-filled or purged with nitrogen, and sealed.

In one aspect of the invention, the storage containers may be pretreated with a medical grade of silicone oil, e.g., Dow-Corning medical grade silicone oil no. 360. For example, the interior surface of a storage bottle is coated with silicone by filling the bottles With silicone oil. After draining the silicone oil, the bottles can be depyrogenated by baking in an oven at a temperature of about 250° C. Without wishing to be bound by any theory or explanation, it is believed that pretreating the storage containers causes formation of a firmly bound polymeric monolayer on the glass surface which reduces the interaction between the bottle and the emulsion, thereby avoiding, if not completely preventing, the presence of free PFC. For example, it is believed that a surface coating of silicone oil may react with the interior glass surface of an infusion bottle, thereby forming a non-extractable silicone-containing monolayer which minimizes the interaction between the emulsion and the bottle. While particular emphasis has been placed upon using a lecithin dispersion and silicone oil for pretreating the emulsion containers, any pretreating fluid may be employed which does not adversely effect the utility of the emulsion. However, when the emulsion is employed for medical purposes, the pretreating fluid must be physiologically acceptable.

Another advantageous result which is obtained by pretreating the bottles is that should the presence of free fluorocarbon be detected, the free fluorocarbon can be substantially completely re-emulsified by agitating or shaking the container or bottle.

The sealed emulsion-containing bottles can be sterilized by any suitable method which does not adversely affect the emulsion. For example, a rotary or stationary autoclave, e.g., which is operated at a temperature of about 121° C., can be used for achieving an acceptable Lethality Factor of about $F_O 21.5$. Lethality Factor is discussed in "Disinfection, Sterilization, and Preservation", edited by Seymour S. Block, second edition, 1977; the content of which is incorporated by reference. In other words, the sealed bottles are heated in a manner which is capable of providing a quantity of heat that is equivalent to being exposed to a temperature of about 121° C. for about 21 minutes.

When the emulsions of the invention are stored under ambient conditions, the emulsions are normally stable for at least about one year. However, the useful shelf life of the emulsions can be extended further by refrigerating the emulsion at temperatures no lower than about 4° C.

Certain aspects of the invention are demonstrated in the following Examples. It is understood that these Examples are provided to illustrate, not limit, the scope of the appended claims.

EXAMPLE 1

This example describes a process for preparing a stable sterilized aqueous emulsion of bisperfluorobutylethylene.

All equipment and containers were cleaned and sterilized before being used. Stainless steel equipment was cleaned with Alcanox solution at room temperature and rinsed with deionized water at neutral pH. Glass equipment was cleansed with a 70/30 isopropanol/water mixture, and rinsed with deionized water which had a neutral pH. After cleaning, all equipment was heated in a drying oven at a temperature of about 250° C. for at least about 4 hours to ensure that the equipment is substantially pyrogen free.

A buffered saline solution was prepared by weighing out the following salts:

| SALT | SUPPLIER | APPROXIMATE AMOUNT |
| --- | --- | --- |
| NaCl | J. T. Baker | 7.4 g |
| NaHCO$_3$ | J. T. Baker | 2.3 g |

The above salts were dissolved into sterile water for injection U.S. Pharmacopeia (USP), and diluted to a final volume of about 1000 ml. The solution was purged with carbon dioxide for about 30 minutes, and filtered through an approximately 0.2 micron filter (supplied by Millipore Inc.). This solution was then placed into a laminar flow hood, Class 100, wherein all subsequent operations were performed.

Approximately 2.8 grams of egg yolk lecithin (a phosphatide supplied by Asahi Chemical Company), were weighed out. The lecithin was stored under nitrogen with dry ice refrigeration. The lecithin was added to approximately 73.2 g of buffered saline to form a dispersion. The mixture was agitated with an Eppenbach Homomixer at room temperature to produce a coarse dispersion which contained multilamellar vesicles that had an average particle size of about 1.2 microns.

The dispersion was heated to about 55°–60° C. under nitrogen, and homogenized by using a Microfluidizer to form a milky dispersion which was composed of unilamellar vesicles that had an average size of about 0.090 micron. The size of the vesicles was determined by using a Coulter N4MD sub-micron particle size analyzer. The dispersion was then cooled to about 15°–20° C.

Approximately 40 g of bisperfluorobutylethylene, was purged with a slow stream of carbon dioxide for about 30 min, and then slowly added to the previously prepared lecithin dispersion. While adding the bisperfluorobutylethylene, the dispersion was agitated rapidly with an Eppenbach Homomixer at a temperature of about 15°–20° C., and for a period of about 15 min, thereby producing an emulsion.

The emulsion was then homogenized by being passed five to ten times through a Microfluidizer. The homogenized emulsion was pressure filtered through a No. 4 Whatman filter, and transferred to a 500 ml infusion bottle which was back-filled with nitrogen.

The infusion bottle was pretreated by being rinsed with lecithin/Tyrode's dispersion for about five minutes at room temperature, and drained. Infusion bottles were alternatively pretreated with a medical grade of silicone oil followed by depyrogenation in an oven at a temperature of about 250° C. for at least about 4 hours.

After filling the pretreated bottles with emulsion, the filled bottles were autoclaved in a stationary autoclave at a temperature of about 121° C. The autoclaving served to sterilize the filled bottles and achieved a Lethality Factor of Fo=21.

EXAMPLE 2

This Example describes a process for preparing a 24% v/v F-44E emulsion.

All equipment was cleaned and depyrogenated substantially in accordance with Example 1.

The following salts were obtained for preparing a 12.5 liter electrolyte solution:

| SALT | SUPPLIER | APPROXIMATE WEIGHT |
| --- | --- | --- |
| NaCl | J. T. Baker | 92.2 g |
| NaHCO$_3$ | J. T. Baker | 29.0 g |

Sterile water for injection was added to the salts until a total weight of 12,500 grams was obtained. The salt solution was purged with $CO_2$ for about 15 minutes. The purged salt solution was pressure filtered by using a 0.2 micron filter, and nitrogen which had been filtered previously with a 0.2 micron filter.

Into a 5 gallon stainless steel vessel equipped with a homomixer, was charged about 12,085 g of the purged and filtered saline solution. While agitating the saline rapidly with the homomixer, about 455.4 g of Asahi phosphatides (egg yolk lecithin) was added to the stainless steel vessel. The resultant saline/lecithin dispersion was mixed with the homomixer for about 15 minutes at room temperature.

Two 5-gallon stainless steel tanks, which were connected via a Mircofluidizer outlet, were prepared for contact with the dispersion. The Microfluidizer had a heat exchanger which was filled with water that had a temperature of about 40°–55° C. The saline/lecithin dispersion was introduced into one of the stainless steel vessels, and was circulated between the vessels at a pressure of 14,000 lb./in.$^2$ while allowing the temperature of the dispersion to rise to about 40°–50° C. The circulation was performed under a nitrogen blanket. The circulation was continued until the solution had achieved its maximum clarity; then the solution was passed at a pressure of about 14,000 lb./in.$^2$ into one of the tanks. The dispersion was cooled to about 5°–15° C. by a low pressure pass through the heat exchanger which had been packed with water ice.

About 7000 grams of F-44E were filtered through a 0.2 micron filter while under pressure from filtered nitrogen (the nitrogen had been filtered thru a 0.2 micron filter). The filtered F-44E was purged with filtered (0.2 micron) $CO_2$ for about 15 minutes. About 6580 grams (3960 ml) of $CO_2$ purged F-44E was poured slowly into the saline/lecithin dispersion. The addition of the F-44E was performed over a period of about 15 minutes while rapidly mixing by using a homomixer. The resultant emulsion was agitated for about 30 minutes while maintaining the temperature at about 15°–20° C.

The emulsion was homogenized for 5 passes at a pressure of about 14,000 psi, and a temperature of between 15°–20° C. The emulsion was then pressure filtered by using filtered nitrogen, and a #1 Whatman filter.

The 500 ml and 100 ml bottles, which were used for storing the emulsion, had been pretreated by being coated with a silicone oil emulsion that was prepared substantially in accordance with Example 4, and heated to a temperature of about 250° C. for about 4 hours. The emulsion was introduced into the silicone treated bottles, and sealed with rubber closures. The sealed bottles were sterilized by using a Market Forge. Sterilmatic autoclave. The sterilization cycle involved heating to a temperature of about 121° C. (250° F.), and delivering a quantity of heat to all units such that a lethality factor of Fo=21 was obtained. The bottles were cooled slowly with water. After the sterilized bottles had cooled to about room temperature, they were agitated or shaken for about 30 minutes by using a media shaking table. The shaking process substantially completely causes any free fluorocarbon, if any, to become re-emulsified.

EXAMPLE 3

This Example describes a process for preparing a 50% v/v F-44E emulsion.

All of the equipment was cleaned and depyrogenated substantially in accordance with Example 1. A Tyrode's electrolyte solution having the following composition was prepared substantially in accordance with Example 2:

| SALT | SUPPLIER | APPROXIMATE AMOUNT |
| --- | --- | --- |
| NaCl | J. T. Baker | 16.80 g |
| KCl | J. T. Baker | .95 g |
| NaHCO$_3$ | J. T. Baker | 5.85 g |
| MgCl$_2$.6H$_2$O | J. T. Baker | 1.25 g |

Approximately 2200 ml of electrolyte solution was obtained, and was filtered and purged with $CO_2$ substantially in accordance with Example 2.

A CaCl$_2 \cdot$2H$_2$O solution was prepared by mixing about 1.03 grams and about 200 ml of water for injection. The calcium chloride solution was purged with CO$_2$ for about 15 minutes. The electrolyte and CaCl$_2$ solutions were mixed together. The mixed solution was diluted to about 2500 ml with water for injection. The mixed solution was filtered by using a 0.2 micron filter and pressurized nitrogen (the nitrogen had been filtered with a 0.2 micron filter).

A dispersion was prepared by introducing about 310.5 g of egg yolk lecithin, and about 2390 grams of the previously prepared and filtered Tyrode's solution, into a stainless steel beaker equipped with a homomixer. The dispersion was mixed at room temperature in the homomixer for 15 minutes. The resultant Tyrode's/lecithin dispersion was transferred to a Microfluidizer set which included a 5 liter round-bottom, 4-neck flask that is connected via a bottom outlet to a Microfluidizer which is in-turn connected to a second 5 liter round-bottom 4-neck flask. The Microfluidizer includes a heat exchanger which was filled with water at a temperature of about 55°–50° C. The Tyrode's/lecithin dispersion was circulated through the Microfluidizer set at a pressure of about 14,000 lb./in.$^2$ which caused the temperature of the dispersion to rise to about 55°–60° C. The circulation was continued until the dispersion achieved its maximum clarity, at which point the dispersion was transferred to the second flask by using the homogenizer. The homogenization was performed under a blanket of filtered (0.2 micron) nitrogen. The Tyrode's/lecithin dispersion was cooled to about 15°–20° C. by being exposed to a low pressure pass through the Microfluidizer heat exchanger that had been packed with water ice.

Approximately 2400 grams of the Tyrode's/lecithin dispersion was introduced into a homomixer. About 3988 grams (2400 ml) of F-44E was purged with carbon dioxide for about 15 minutes, and then passed through a 0.2 micron filter, while applying a pressure from nitrogen (filtered thin a 0.2 micron filter). Over a period of about 15 minutes, the F-44E was poured slowly into the Tyrode's/lecithin dispersion while rapidly mixing within the homomixer, thereby, obtaining an emulsion. The emulsion was agitated for about 30 minutes while maintaining the temperature between about 15°–20° C.

The emulsion was homogenized by being passed through the Microfluidizer 10 times at a pressure of about 14,000 psi, and at a temperature of about 25° C. The emulsion was filtered by using a #4 Whatman Filter and applying pressure from nitrogen (which had been filtered previously through a 0.2 filter).

The filtered emulsion was charged into 500 ml and 100 ml bottles, and sealed with robber closures. The sealed bottles were sterilized in a rotary autoclave by placing the bottles into an autoclave basket, which included a thermocouple, that was located above a water bath. The sealed bottles in the autoclave basket were immersed into the water bath, and rotated at about 30 rpm. The temperature of the water bath was about 250° F. The sealed bottles were surrounded by the water bath for about 10–12 minutes which was sufficient to achieve a lethality factor of F$_o$=15. The autoclave was cooled to about 70° F. using a temperature differential, between the interior region of the bottle and the surrounding water bath, of not more than about 30° F. The sealed bottles within the basket continued to be rotated for about 30 minutes with a temperature differential of less than about 5° F.

EXAMPLE 4

This Example describes a process which may be used for preparing a pretreatment fluid that can be applied onto the interior surface of an emulsion storage container.

Approximately 39 ml of medical grade silicone oil (which is sold by Dow-Corning under the trademark "DC-365"), and about 1 ml of non-ionic surfactant(which is sold by Rohm-Haas Company under the trademark "Triton X-100"), were added to a Waring blender. The mixture was agitated at high speed for about 5 minutes. Then approximately 63 ml of distilled water was added, and the mixture was agitated further.

The resultant agitated mixture or pretreatment fluid comprised an emulsion concentrate which can be stored for up to one week prior to being used.

The emulsion concentrate was diluted prior to being applied to the storage containers. About 1000 ml of distilled water was added to a Waring blender, and agitated. About 21 ml of emulsion concentrate was introduced into the agitated distilled water, and mixed for at least about five minutes.

Approximately 1,000 ml of emulsion was poured into a recirculating spray device. The spray device was used to spray the interior surface of four (4) 500 ml bottles for about 20 seconds with the pretreating emulsion. The bottles were allowed to drain. The coated bottles were baked or depyrogenated in an oven for about four hours at about 250° C.

The following is claimed:

1. A method for making a stable emulsion having substantially completely no unemulsified fluorocarbon comprising the steps of:

preparing an aqueous electrolyte solution, preparing a dispersion by introducing at least one emulsifying agent into the solution, admixing at least one perfluorocarbon into the dispersion to form an emulsion, applying an interior coating comprising silicone oil or lecithin to a storage container, storing the emulsion in the container which has a non-oxidizing atmosphere, wherein said emulsion contains substantially completely no unemulsified perfluorocarbon, and;

optionally agitating the emulsion.

2. The method of claim 1 wherein said perfluorocarbon comprises at least one of perfluorooctyl bromide and bisperfluorobutyl ethylene.

3. The method of claim 1 wherein said electrolyte comprises at least one member from the group consisting of sodium chloride, potassium chloride, dibasic sodium phosphate, sodium bicarbonate, hydrated sodium citrate, hydrated calcium chloride, and hydrated magnesium chloride.

4. The method of claim 1 wherein said emulsifying agent comprises egg yolk lecithin.

5. The method of claim 1 further comprising sterilizing the stored emulsion.

6. The method of claim 1 further comprising purging at least one of the electrolyte solution and the perfluorocarbon with carbon dioxide.

7. The method of claim 1 further comprising depyrogenating said coated container.

8. The method of claim 7 wherein said depyrogenating comprises heating said coated container to about 250° C.

9. A method for making a stabilized fluorocarbon emulsion comprising:

provec a fluorocarbon emulsion which comprises a fluorocarbon, an emulsifying agent and an aqueous medium; and storing the emulsion in a container which has been coated with a composition comprising silicone oil or lecithin, wherein the stored emulsion is substantially free of unemulsified fluorocarbon.

10. A stable emulsion comprising about 10 to about 50% volume/volume (v/v) of a liquid perfluorocarbon which has a molecular weight in the range of about 460–520, about 1–8% weight/volume (w/v) of an emulsifying agent, and the balance comprising a physiologically acceptable saline solution; wherein said emulsion contains substantially no unemulsified fluorocarbon and is stored in a container, the interior of which has been coated with a composition comprising silicone oil or lecithin.

11. The emulsion of claim 10 which is prepared by admixing together said perfluorocarbon, emulsifying agent and saline solution and storing said admixture in said container.

12. The emulsion of claim 10 wherein said coated container is also depyrogenated.

13. The emulsion of claim 12 wherein said coated container is depyrogenated by heating to about 250° C.

* * * * *